US011401866B2

(12) United States Patent
Rami et al.

(10) Patent No.: US 11,401,866 B2
(45) Date of Patent: Aug. 2, 2022

(54) ACTIVE DEVICE FOR ATTENUATING ACOUSTIC EMISSIONS FOR A TURBOJET ENGINE INCLUDING CONTROLLED TURBINES

(71) Applicant: Safran Nacelles, Gonfreville l'Orcher (FR)

(72) Inventors: Jean-Paul Rami, Gonfreville l'Orcher (FR); Hervé Hurlin, Gonfreville l'Orcher (FR); Jean-Baptiste Goulard, Gonfreville l'Orcher (FR); Marc Versaevel, Moissy Cramayel (FR); Philippe Micheau, Gonfreville l'Orcher (FR); Julien Drant, Gonfreville l'Orcher (FR); Ambre Allard, Gonfreville l'Orcher (FR); Alain Berry, Gonfreville l'Orcher (FR); Raymond Robert, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 0 days.

(21) Appl. No.: 17/014,527

(22) Filed: Sep. 8, 2020

(65) Prior Publication Data
US 2020/0400076 A1 Dec. 24, 2020

Related U.S. Application Data

(63) Continuation of application No. PCT/FR2019/050496, filed on Mar. 6, 2019.

(30) Foreign Application Priority Data

Mar. 8, 2018 (FR) ...................................... 18/52024

(51) Int. Cl.
*F02C 7/24* (2006.01)
*F02K 1/34* (2006.01)
(Continued)

(52) U.S. Cl.
CPC ................. *F02C 7/24* (2013.01); *F02C 7/045* (2013.01); *F02K 1/34* (2013.01); *F16K 31/041* (2013.01);
(Continued)

(58) Field of Classification Search
CPC ......... F02C 7/045; G10K 7/04; G10K 11/178; F01N 1/065; F01N 1/18; B64C 2220/00; B64D 2033/0206; F05D 2260/962
See application file for complete search history.

(56) References Cited

U.S. PATENT DOCUMENTS 2,043,416 A * 6/1936 Lueg ................ G10K 11/17857
381/71.1
3,572,960 A * 3/1971 McBride ................... F02K 3/06
415/115
(Continued)

FOREIGN PATENT DOCUMENTS

FR 2370170 6/1978
FR 3029831 6/2016

OTHER PUBLICATIONS

International Search Report for International Application PCT/FR2019/050496, dated Jun. 25, 2019.

*Primary Examiner* — Todd E Manahan
*Assistant Examiner* — Marc J Amar
(74) *Attorney, Agent, or Firm* — Burris Law, PLLC

(57) ABSTRACT

An active device for attenuating the acoustic emissions of an aircraft turbojet engine includes circulation conduits for a pressurized air flow rate supplying rotary elements each having a pulsation system for the delivered air. The rotary elements are controlled in amplitude and phase and deliver, to outlet diffusers, a pulsed air flow rate with a pulsation at the frequency of the noise to be attenuated having an amplitude and a phase adjusted according to a local feed- (Continued)

back law with microphones to attenuate the radiated acoustic power.

10 Claims, 2 Drawing Sheets

(51) Int. Cl.
  *F02C 7/045* (2006.01)
  *G10K 11/178* (2006.01)
  *F16K 31/04* (2006.01)
(52) U.S. Cl.
  CPC ...... *G10K 11/178* (2013.01); *F05D 2260/962* (2013.01)

(56) References Cited

U.S. PATENT DOCUMENTS

| | | | | |
|---|---|---|---|---|
| 4,044,203 A * | 8/1977 | Swinbanks | ......... | F16L 55/0333 381/71.5 |
| 4,199,295 A * | 4/1980 | Raffy | ...... | F02C 7/045 181/206 |
| 4,255,083 A * | 3/1981 | Andre | ...... | G10K 11/1785 415/119 |
| 4,523,517 A * | 6/1985 | Cronin | ...... | B64D 13/06 454/74 |
| 4,649,853 A * | 3/1987 | Powell | ...... | G10K 7/04 116/147 |
| 4,747,467 A * | 5/1988 | Lyon | ...... | F01D 25/30 181/218 |
| 4,763,358 A * | 8/1988 | Danley | ...... | H04R 23/00 310/80 |
| 4,796,009 A * | 1/1989 | Biersach | ...... | G10K 9/13 181/144 |
| 5,058,703 A * | 10/1991 | Ealba | ...... | F01N 3/2892 181/228 |
| 5,140,641 A * | 8/1992 | Danley | ...... | G10K 7/04 340/404.3 |
| 5,191,618 A * | 3/1993 | Hisey | ...... | H02K 26/00 340/815.87 |
| 5,279,109 A * | 1/1994 | Liu | ...... | F02C 7/052 60/39.092 |
| 5,340,271 A | 8/1994 | Freeman et al. | | |
| 5,377,275 A * | 12/1994 | Suzuki | ...... | G10K 11/17854 381/71.5 |
| 5,446,790 A * | 8/1995 | Tanaka | ...... | G10K 11/17823 381/71.14 |
| 5,478,199 A * | 12/1995 | Gliebe | ...... | F02C 7/045 415/119 |
| 5,680,754 A * | 10/1997 | Giffin | ...... | F02K 3/02 60/226.1 |
| 5,732,547 A * | 3/1998 | Olsen | ...... | G10K 11/17857 60/204 |
| 5,833,433 A | 11/1998 | May et al. | | |
| 5,896,742 A * | 4/1999 | Black | ...... | F23R 3/48 60/39.37 |
| 5,937,908 A * | 8/1999 | Inoshiri | ...... | F15D 1/02 138/39 |
| 5,979,593 A * | 11/1999 | Rice | ...... | G10K 11/17883 181/207 |
| 6,112,514 A * | 9/2000 | Burdisso | ...... | B64D 33/02 60/226.1 |
| 6,438,941 B1 * | 8/2002 | Elliott | ...... | F01D 17/105 60/226.1 |
| 6,595,319 B1 * | 7/2003 | Huff | ...... | F01N 1/02 181/250 |
| 6,973,193 B1 * | 12/2005 | Tse | ...... | B64D 33/06 181/204 |
| 7,631,483 B2 * | 12/2009 | Mani | ...... | B64D 33/02 181/214 |
| 8,033,358 B2 * | 10/2011 | Ivers | ...... | F02C 7/045 181/214 |
| 8,192,147 B2 * | 6/2012 | Haas | ...... | B64D 33/02 415/144 |
| 9,275,628 B2 * | 3/2016 | Schnitta | ...... | G10K 11/17873 |
| 2003/0159429 A1* | 8/2003 | Langston | ...... | F02K 1/76 60/226.2 |
| 2004/0045767 A1* | 3/2004 | Byrne | ...... | G10K 11/175 181/241 |
| 2005/0205351 A1* | 9/2005 | D'Angelo | ...... | F01N 1/00 181/216 |
| 2006/0219475 A1* | 10/2006 | Olsen | ...... | F01D 25/32 181/214 |
| 2006/0266051 A1* | 11/2006 | Gukeisen | ...... | F16K 1/126 60/785 |
| 2009/0025393 A1* | 1/2009 | Sheldon | ...... | F02C 7/32 60/725 |
| 2009/0188257 A1* | 7/2009 | Kirby | ...... | F01D 17/105 60/785 |
| 2016/0083073 A1* | 3/2016 | Beckman | ...... | G10K 11/17857 40/463 |
| 2016/0318614 A1* | 11/2016 | Bultemeier | ...... | F24F 13/06 |
| 2018/0052040 A1* | 2/2018 | Van Duyn | ...... | F16K 31/1223 |
| 2018/0066545 A1* | 3/2018 | Meys | ...... | F01D 21/003 |
| 2018/0102124 A1* | 4/2018 | Huo | ...... | G10K 11/178 |
| 2018/0195464 A1* | 7/2018 | Abel | ...... | F02K 1/566 |
| 2018/0301136 A1* | 10/2018 | Nguyen | ...... | F02C 7/00 |
| 2019/0100319 A1* | 4/2019 | Mackin | ...... | G10K 11/178 |
| 2020/0063600 A1* | 2/2020 | Roberge | ...... | G10K 9/18 |

* cited by examiner

ACTIVE DEVICE FOR ATTENUATING ACOUSTIC EMISSIONS FOR A TURBOJET ENGINE INCLUDING CONTROLLED TURBINES

CROSS-REFERENCE TO RELATED APPLICATIONS

This application is a continuation of International Application No. PCT/FR2019/050496, filed on Mar. 6, 2019, which claims priority to and the benefit of FR 18/52024 filed on Mar. 8, 2018. The disclosures of the above applications are incorporated herein by reference.

FIELD

The present disclosure relates to an active device for attenuating tonal acoustic emissions for an aircraft turbojet engine, as well as a turbojet engine nacelle equipped with such a device.

BACKGROUND

The statements in this section merely provide background information related to the present disclosure and may not constitute prior art.

Aircraft turbojet engines receive fresh air coming from the upstream side, and reject hot gases coming from the combustion of the fuel delivering thrust on the downstream side. For bypass turbojet engines, fan blades disposed about the motorization generate a significant secondary cold air flow along an annular flow path passing between this engine and a surrounding a nacelle, which adds high thrust.

The different portions rotating in the hot air and cold air flows generate acoustic vibrations constituting sound sources, which one seeks to attenuate in order to reduce nuisance.

Particularly, in order to increase the performance of turbojet engines, the tendency is to reduce the speed of rotation of the fan and the number of blades, which has the consequence of reducing the fundamental frequency of the acoustic waves. An increase in the air dilution rate is also achieved, which gives the tonal noise of the fan a greater portion compared to other noise sources of the motorization, in particular the noise of the jet which splits into two concentric jets, the hot jet in the center and the cold jet around.

A type of passive system known to attenuate acoustic vibrations, presented in particular by the document FR-A1-3029831, uses acoustic panels lining the interior with surfaces receiving sound waves, comprising a microporous outer skin disposed in front of closed cells constituting resonators, called "Helmholtz" resonators.

By adjusting the depth of the cavity to a quarter of a wavelength of a nominal frequency, we obtain an acoustic attenuation centered on this frequency.

This passive solution provides efficiency for vibrations close to the nominal frequency, but is not very efficient beyond that. In addition, with the increase in the low frequencies of the acoustic emissions of modern motorizations, the depth of the cells, and therefore the thickness of the panels, which can reach 50 to 80 mm, must be increased, which poses issues of mass and size.

Moreover, different active systems for attenuating acoustic waves are known. One type of known active system uses loudspeakers or piezoelectric amplifiers, controlled by an electric current produced from signals given by microphones measuring the frequency, intensity and phase of sound emissions, in order to generate acoustic vibrations in interference, making it possible to attenuate these sound emissions.

These systems requiring high power, pose issues of mass and consume a significant electrical energy, and can be difficult to integrate into a turbojet engine nacelle.

The present disclosure addresses these and other related issues presented by the prior art.

SUMMARY

This section provides a general summary of the disclosure and is not a comprehensive disclosure of its full scope or all of its features.

In one form, the present disclosures includes an active device for attenuating tonal acoustic emissions of a nacelle of an aircraft turbojet engine. The active device includes circulation conduits for controlled pressurized air flow rate supplying rotary elements of the device, where the rotary elements comprise a (chopper) system for pulsating the flow of the delivered air. The rotary elements, controlled in speed and in angular position, deliver to outlet diffusers of the device a pulsed air flow rate with a pulsation having an adjusted frequency, phase, and amplitude so as to reduce the acoustic power radiated out of the nacelle and in that the rotary elements called choppers comprise downstream an outlet sleeve having a passage geometry for the output air flow rate, which is adjustable.

At least one advantage of the active device is that, from a source of pressurized air, for example, taking a flow rate from the motorization of the turbojet engine, or from the flow path of the secondary flow of a bypass turbojet engine, one obtains in outlet of the air jet from the device a secondary acoustic field which interferes with the primary acoustic field in the flow path of the turbojet engine in order to attenuate the acoustic power radiated outside the nacelle. This provides an attenuation of the acoustic emission of the turbojet engine.

It will be noted that hereinafter generally, the expression air flow comprises all types of gas flow, which may in particular include combustion gases.

The active device for attenuating tonal acoustic emissions according to the present disclosure may have one or more of the following features, which may be combined with one another.

In one form, the active device for attenuating tonal acoustic emissions includes acoustic pressure sensors (called microphones) which make it possible to calculate in real time the setpoints of speed of rotation and of angular position with respect to time of the rotary elements or choppers as well as the setpoint of the flow rate control valve, all this in order to calibrate respectively in frequency, phase and amplitude the generated acoustic wave.

In one form, the active device for attenuating tonal acoustic emissions includes a controller for obtaining information regarding the instantaneous angular position of the fan of the turbojet engine relative to the reference frame of the nacelle. This active device thus knows the phase and the exact main frequency of the acoustic wave generated by the blades of its fans.

In one form, each active device for attenuating tonal acoustic emissions includes a rotor comprising air passage openings making it possible to chop the flow at the outlet of the device. Passing in front of each window causes a pulsation on the output air flow.

Particularly, the rotor can form a drum rotating along its axis, having a transverse face equipped with openings for the passage of air into the drum, the openings being distributed over the cylindrical contour of this drum.

Particularly, the rotor of the active device for attenuating tonal acoustic emissions can be driven by an electric motor, or a pneumatic motor including an electromagnetic speed regulating brake.

In another form, each active device for attenuating tonal acoustic emissions requires a flow rate control valve disposed upstream in order to modulate the chopping amplitude of the flow rate.

In one form, a flowing chopper can supply one or more or all of the pulsed air outlets in the flow path of the turbojet engine via a pneumatic distribution circuit.

In another form, the pulsed air outlets include downstream an outlet sleeve having a passage geometry of the output air flow rate, which is adjustable in length.

In yet another form, the pulsed air outlets include downstream an obstruction device, which is adjustable. In one form, each pulsed air flow outlet includes a diffuser comprising an attachment to the back of a wall, to diffuse the pulsed air flow rate in front of this wall. As example, the diffuser may be secured to a wall of the aircraft turbojet engine to diffuse the attenuating air flow rate in front of the wall.

The present disclosure also provides an aircraft turbojet engine nacelle, including an active device for attenuating tonal acoustic emissions (of the radiated acoustic power) comprising any of the preceding characteristics.

In one form, the circulation conduit includes an air inlet taken from a primary flow of the motorization of the turbojet engine, from a secondary flow given by a fan of a bypass turbojet engine, or from another source comprising a compressor, a booster, or a compressed air accumulator.

In another form, the active device for attenuating tonal acoustic emissions includes pulsed air flow rate diffusers distributed along rings arranged transversely in the nacelle, upstream or behind a fan of a bypass turbojet engine.

In yet another form, the active device for attenuating tonal acoustic emissions includes microphones distributed along rings disposed transversely in the nacelle, upstream or behind the pulsed flowing outlets.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
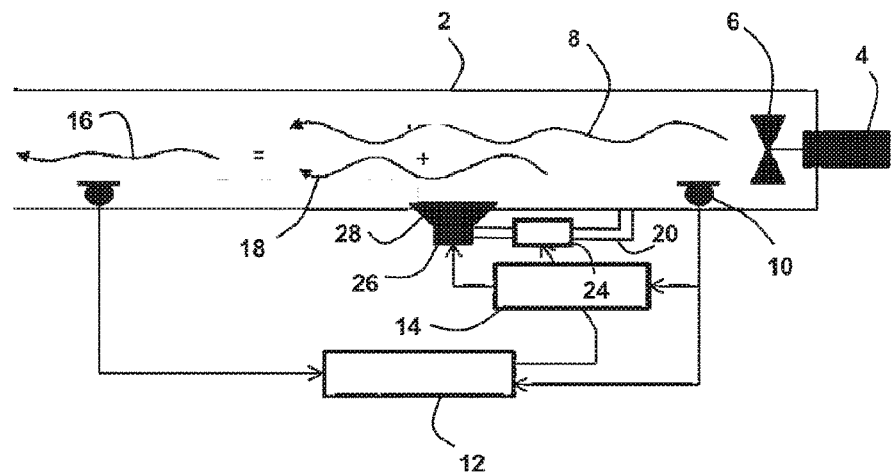
FIG. 1 is a schematic diagram of active attenuation of the noise of a turbojet engine according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
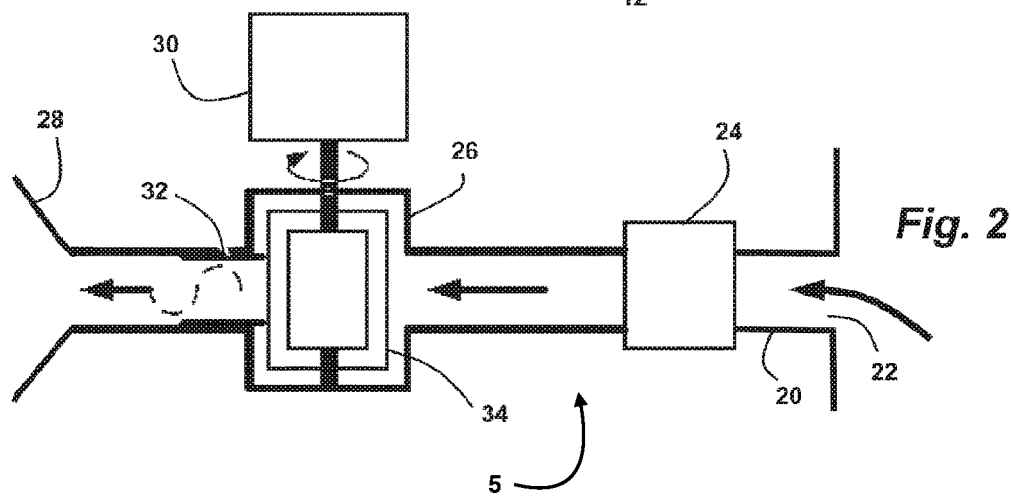
FIG. 2 is a schematic diagram of an active device for attenuating tonal acoustic emissions of chopping=by rotary shutter, which forms a pulsed flow generator according to the present disclosure.

FIGS. 1 and 2 show a flow path 2 channeling a main pressurized air flow 8 generated by a fan 6 actuated by a motorization 4, having acoustic vibrations that one seeks to attenuate.

A circulation conduit 20 includes an air inlet 22 disposed on the wall of the flow path 2, receiving a flow rate of pressurized air taken from this flow, then successively a flow rate control valve 24 which delivers this flow rate of air to a chopper (i.e., a rotary element) 26 behaving like a pulsation system, then a diffuser 28 opening onto the wall of the flow path.

The rotary element 26, which chops the air flow rate, forms a pulsed flowing generator that includes a rotor 34 driven by the actuator 30 (also referred to herein as a motor), having cavities constituting the chopping system, whose speed of rotation and phase are controlled.

The air flow rate then passes through a possibly adjustable sleeve 32 (also referred to an adjustable outlet sleeve) disposed at the outlet of the rotary element 26, having a passage geometry for this adjustable air flow rate, which delivers this flow rate to the diffuser 28.

It will be noted that the sound power exiting through the diffuser 28 comes mainly from the air flow rate taken from the air inlet 22 in the main air flow. The rotary element 26 only performs periodic modulation of the incoming air flow rate.

The diffuser 28 delivers a pulsed air flow rate generating an acoustic wave (secondary field) 18, at the frequency of the primary field to be attenuated from the main pressurized air flow 8, to obtain a less noisy outgoing air flow 16, that is to say having a reduction in the acoustic power radiated out of the nacelle for this fundamental frequency.

Microphones 10 (i.e., sensors) constituting sound pressure measurement systems in the nacelle, deliver data representing in particular the frequency, amplitude and phase of the residual field, to a control algorithm 12, and to a controller 14 receiving data of this algorithm.

Particularly, the microphones 10 produce a feedback loop to reproduce a local virtual acoustic impedance equivalent to a local law between the acoustic pressure and the setpoint given to each tonal pneumatic source.

The controller 14 controls the flow rate control valve 24 to adjust the pressure and the average air flow rate delivered to the rotary element 26, and controls the motor 30 with its encoder to adjust the speed of rotation of the rotor 34 and its angular setting, so as to generate in its output flow rate.

The adjustable outlet sleeve 32 allows completing output air flow rate characteristics.

For this purpose, the adjustable sleeve 32 can be adjusted in its length so that it partly forms a length adjustable channel between the rotary element 26 or chopper 26 and the diffuser 28.

The adjustable sleeve 32 then makes it possible to vary this length so as to adjust the channel according to the frequency delivered by the rotary element or chopper 26 in order to increase the sound power radiated at the outlet of the diffuser 28.

The variation in the length of the channel is advantageously at least half a wavelength of the lowest frequency delivered by the rotary element 26.

According to a series of characteristics that can be taken alone or in combination:

the connection between the adjustable outlet sleeve 32 and the rotary element 26 is an embedding connection;

the connection between the diffuser 28 and the adjustable outlet sleeve 32 is a sliding connection; and the sliding connection can advantageously be adjusted and blocked in translation.

These characteristics make it possible to modulate the sound power at the outlet of the diffuser 28.

The translational adjustment of the adjustable sleeve 32 can either be calibrated at the factory or controlled by an electric actuator.

Such an actuator can advantageously be of the solenoid type and controlled by an amplitude servo loop.

When the translational adjustment of the adjustable sleeve 32 is controlled by an electric actuator, the measurements made by the microphones 10 and which are located downstream of the sound field are processed in real time by the control algorithm 12 and the controller 14, this in order to improve the sound amplitude of the counter-noise coming from the diffuser 28. It will be understood that the counter-noise results from the noise to be attenuated.

As a variant, other sources of air pressure can be used to supply the circulation conduit 20, comprising for example a primary flow of the engine of the turbojet engine motorization, coming from its turbine or from a stage of its compressor, or coming from a specific air compressor driven by an electric motor, a booster or an air pressure accumulator.

Figure 3:
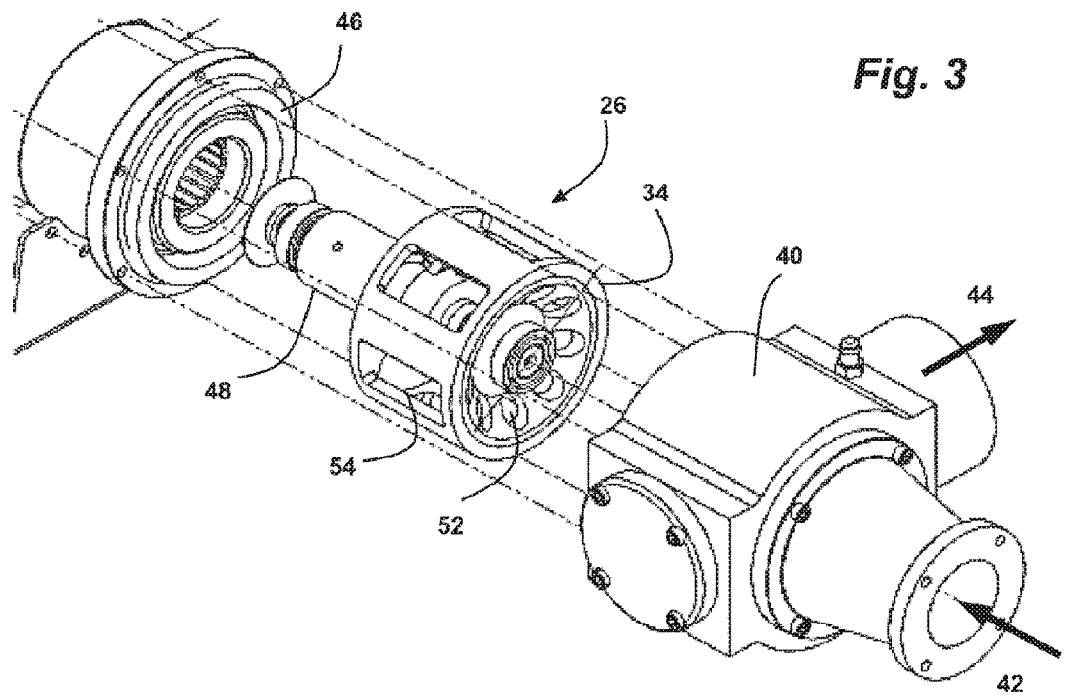
FIG. 3 shows an exploded view of an active device for attenuating tonal acoustic emissions of chopping with a drum rotor having openings for the passage of air flow according to the present disclosure.

FIG. 3 shows a rotary element 26 including a housing 40 having an axial inlet 42 receiving the inlet air flow rate, and a lateral outlet 44 delivering the output air flow rate.

The rotor 34 forms a drum disposed along the axis of rotation, including a flange facing the inlet 42 having a succession of bores 52 so as to form a high permeability to this air which enters the drum. The contour of the drum has six rectangular openings forming regularly distributed windows 54, elongated parallel to the axis, each include a width substantially equal to the width of the wall between two openings.

The rotor 34 is extended on the side opposite the inlet 42 by an armature 48 engaged in a stator 46 forming an inductor, constituting an electric motor making it possible to control the speed of rotation of this rotor as well as its angular setting giving its phase.

In this way, each window 54 is located successively in front of the outlet 44, forming a flow rate chopper which gives in the air outlet flow rate a pulsation corresponding to the frequency of passage of these openings, with a phasing corresponding to the angular setting of these openings.

As a variant, the rotor 34 can be driven by any other motorization system, such as a pneumatic motor supplied by an air bypass coming from the turbojet, and braked by an electromagnetic brake to adjust its speed of rotation.

Figure 4:
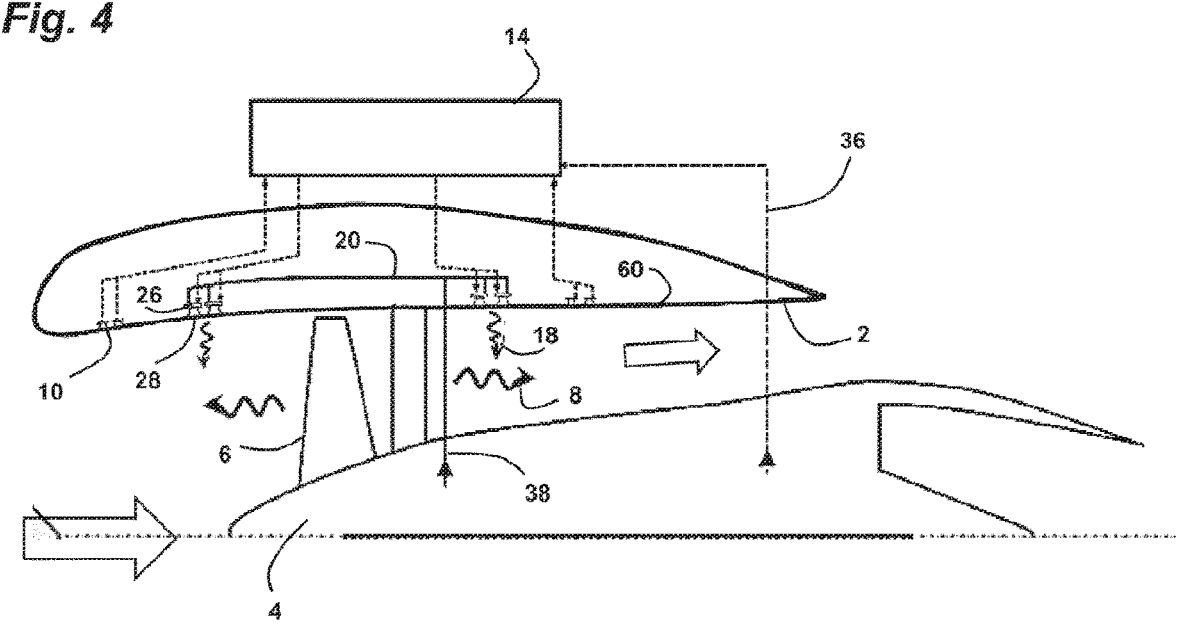
FIG. 4 is an axial sectional diagram of a bypass turbojet engine equipped with the active control device of the radiated acoustic power according to the present disclosure.
Figure 5:
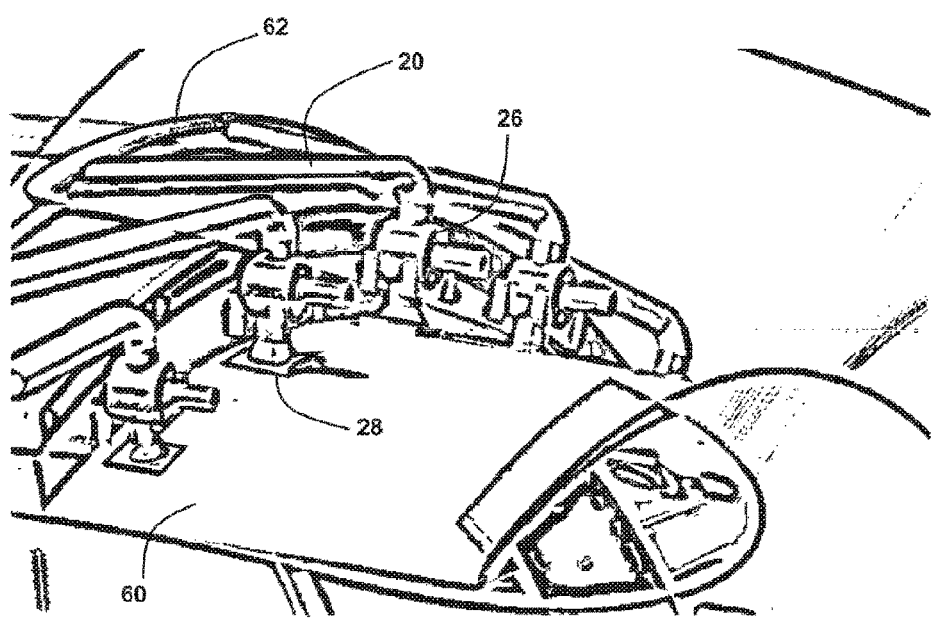
FIG. 5 shows choppers installed in a cold air flow path of the turbojet engine according to the present disclosure.

FIGS. 4 and 5 show a pressurized air flow rate 38 taken directly from the turbojet engine motorization, which supplies the rotary elements 26 disposed about the outer wall 60 of the air inlet or of the annular air cold flow path, by forming around the nacelle both upstream and downstream of the fan 6, a set of two parallel rings close to each other.

The motorization of the turbojet engine also supplies the controller 14 with information 36 that provides the angle of rotation, which makes it possible to directly know the frequency of different acoustic emissions, in particular of the blades of the fan 6.

FIG. 5 shows in detail a set of turbines 26, also called rotary elements or choppers, disposed in a ring about the wall 60 of a flow path of cold air flow, each connected by a conduit 20 supplied by a circular conduit 62 circling the nacelle. Each turbine 26 is disposed as close as possible to its diffuser 28, which is fixed directly to the outer wall 62.

In addition, the nacelle of the turbojet engine may include on its walls of acoustic panels having conventional resonators, to work on the attenuation of medium frequencies while the active device 5 according to the present disclosure attenuates low frequencies. In this way, each device works on its own frequency ranges.

In a simple and efficient way, with a system consuming little energy, using an air flow rate having a pressure in the range of 2 to 3 bars, a significant attenuation of the sound emission levels of the fan 6 which can reach more than 150 dB is obtained.

The present disclosure is described in the foregoing by way of example. It is understood that one skilled in the art is able to achieve different forms of the present disclosure without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An aircraft turbojet nacelle of an aircraft turbojet engine comprising an active device for attenuating tonal acoustic emissions of the aircraft turbojet nacelle, the active device comprising:

a circulation conduit for supplying controlled pressurized air flow from a flow path;

a diffuser disposed at an outlet of the circulation conduit; and a rotary element receiving a supplied controlled pressurized air of the air flow and being fluidly coupled to the diffuser, wherein the rotary element comprises:

a chopping system configured to pulsate a flow of the supplied controlled pressurized air, and an outlet sleeve positioned between the chopping system and the diffuser, wherein:

the rotary element is controlled in speed and delivers to the diffuser a pulsed air flow rate of the pulsated flow with a pulsation having an adjusted frequency, phase, and amplitude so as to reduce acoustic power radiated out of the nacelle, and the outlet sleeve has an adjustable passage geometry for the pulsed air flow rate, wherein the adjustable passage geometry of the outlet sleeve is adjusted based on the adjusted frequency of the pulsed air flow rate, the adjustable passage geometry of the outlet sleeve adjusts a length of the outlet sleeve between the rotary element and the diffuser, wherein the circulation conduit comprises an air inlet taken on a secondary flow given by a fan of the aircraft turbojet engine, and wherein the aircraft turbojet engine is a bypass turbojet engine.

2. The aircraft turbojet nacelle according to claim 1, further comprising a plurality of sensors to monitor acoustic waves in the nacelle in order to calculate, in real time, control of the rotary element.

3. The aircraft turbojet nacelle according to claim 1, further comprising a controller configured to obtain information regarding an angle of rotation of the aircraft turbojet engine.

4. The aircraft turbojet nacelle according to claim 1, wherein the rotary element is formed by a rotor comprising windows for passage of the pulsed air flow rate of the rotary element.

5. The aircraft turbojet nacelle according to claim 4, wherein the rotor forms a drum rotating along its axis and having a transverse face equipped with air inlet holes in the drum, the windows being distributed over a cylindrical contour of the drum.

6. The aircraft turbojet nacelle according to claim 1, wherein the rotary element is driven by an electric motor or a pneumatic motor and further includes an electromagnetic speed regulation brake.

7. The aircraft turbojet nacelle according to claim 1, wherein the active device includes a plurality of flow rate control valves arranged upstream of the rotary element.

8. The aircraft turbojet nacelle according to claim 1, wherein the diffuser is located at a pulsed flowing outlet downstream of the rotary element and is secured to a wall of the aircraft turbojet engine to diffuse an attenuating air of the pulsed flow in front of the wall.

9. The aircraft turbojet nacelle according to claim 1 further comprising an air flow rate control valve.

10. The aircraft turbojet nacelle according to claim 1, further comprising a plurality of the active devices for attenuating tonal acoustic emissions disposed in a ring.

* * * * *